United States Patent [19]

Kay

[11] 4,428,643
[45] Jan. 31, 1984

[54] OPTICAL SCANNING SYSTEM WITH WAVELENGTH SHIFT CORRECTION

[75] Inventor: David B. Kay, Rochester, N.Y.

[73] Assignee: Xerox Corporation, Stamford, Conn.

[21] Appl. No.: 252,508

[22] Filed: Apr. 8, 1981

[51] Int. Cl.³ .................. G02B 27/17; G03H 1/04
[52] U.S. Cl. ............................................. 350/3.71
[58] Field of Search ...................................... 350/3.71

[56] References Cited

U.S. PATENT DOCUMENTS

| | | | |
|---|---|---|---|
| 3,721,486 | 3/1973 | Bramley | 350/6 |
| 3,953,105 | 4/1976 | Ih | 350/7 |
| 4,067,639 | 1/1978 | Kramer | 350/6 |
| 4,094,575 | 6/1978 | Kellie | 350/3.67 |
| 4,179,183 | 12/1979 | Tateoka et al. | 350/6.1 |
| 4,239,326 | 12/1980 | Kramer | 350/3.71 |

OTHER PUBLICATIONS

Holographic Diffraction Gratings (Applied Physics Letters), Sep. 1, 1966, vol. 9, No. 5, N. George and J. W. Matthews.
Light Beam Deflection Using Holographic Scanning Techniques (Applied Optics), Feb. 1969, vol. 8, No. 2, D. H. McMahon, A. R. Franklin and J. B. Thaxter.
Computer-Based Analysis of Hologram Imagery and Aberrations (Applied Optics), Mar. 1971, vol. 10, No. 3, J. N. Latta.
Diffraction Gratings (Optical Engineering), Sep.-Oct. 1976, vol. 15, No. 5, E. G. Loewen.
Grating Efficiency Theory as It Applies to Blazed and Holographic Gratings (Applied Optics), Oct. 1977, vol. 16, No. 10, E. Loewen, M. Neviere and D. Maystre.
Design Considerations of 2-D Holographic Scanners (Applied Optics), Mar. 1, 1978, vol. 17, No. 5, C. S. Ih, pp. 748-754, FIG. 2.

Primary Examiner—Bruce Y. Arnold

[57] ABSTRACT

A spot scanning holographic spinner system incorporates an optical element in the optical path to provide compensation for wavelength shifts in the coherent light source. The device is located in a plane parallel to the spinner and consists of a diffraction grating having the same properties as gratings formed on the spinner surface.

7 Claims, 7 Drawing Figures

OPTICAL SCANNING SYSTEM WITH WAVELENGTH SHIFT CORRECTION

BACKGROUND AND PRIOR ART STATEMENT

The present invention relates to an optical spot scanning system and more particularly to an improved holographic scanning system which includes a compensation element to correct for cross-scan errors in the scan line due to wavelength shifts occurring in the light source.

Holographic scanners which utilize a rotating disc having a plurality of holographically formed lenses or gratings are known in the art. Representative disclosures are provided in the Prior Art List filed with the present application. These prior art spinners are subject to certain problems resulting from their geometry. These problems, briefly stated, are scan line "bow", in the image plane, spinner wobble and spinner "wedge" both resulting in colinear multiple scan lines, and spinner decentration causing output scan distortion. These problems are more thoroughly analyzed in co-pending U.S. Application Ser. No. 044,000 filed on May 31, 1979 now U.S. Pat. No. 4,289,371 and assigned to the same assignee as the present invention. In this co-pending application, whose contents are hereby incorporated by reference, the enumerated problems are compensated for by utilizing, as the reconstruction element, a spinner having on its surface a plurality of holographically formed plane linear diffraction gratings. By strict mathematical methods, it was demonstrated that certain relationships existed between the wavelength of the reconstruction light source, the grating period and the angles of incidence and diffraction, whereby most of the inherent spinner problems were either corrected or minimized. The application also addressed another problem, wavelength shift, which originates with the reconstruction light source. This shift, or change in the source wavelength, results in corresponding changes in the output diffraction angle, and hence, an undesirable deflection of the output scan line. The plane linear diffraction grating spinner is effective only when a monochromatic, stable-wavelength, light source was utilized. Thus, a stable source He-Ne laser was used in the exemplary example provided in said application.

It is therefore desirable to utilize a plane grating holographic spinner such as that described in the co-pending application but which is further improved by elimination of the effects caused by wavelength shifts in the coherent light source. Such a technique is becoming of considerable importance because of the increasing use of laser diodes as the light source in scanning systems. These diodes can experience wavelength shifts of up to 3 nm or more due to junction heating over its output power range.

The present invention is therefore directed to an optical scanning system including a spinner having formed thereon at least one plane linear diffraction grating having a constant grating period d, a stationary wavelength compensation diffraction grating having properties identical to said grating formed on said spinner surface, said stationary grating placed in a plane parallel and in optical alignment with said spinner grating, a collimated reconstruction light source of wavelength $\lambda_r$ which provides a beam of light directed at an angle of incidence $\theta_i$ onto said compensation grating, said grating diffracting said beam at a diffraction angle of $\theta_d$, said incidence angle $\theta_i \simeq \theta_d \simeq 45°$, and the ratio of $\lambda_r$ to grating spacing d having a value between 1 and 1.618, whereby the light beam diffracted by the compensation grating is incident on the spinner grating at an angle $\phi_i$ and is diffracted out of said grating at an angle $\phi_d \simeq \theta_i$.

DESCRIPTION

Figure 1:
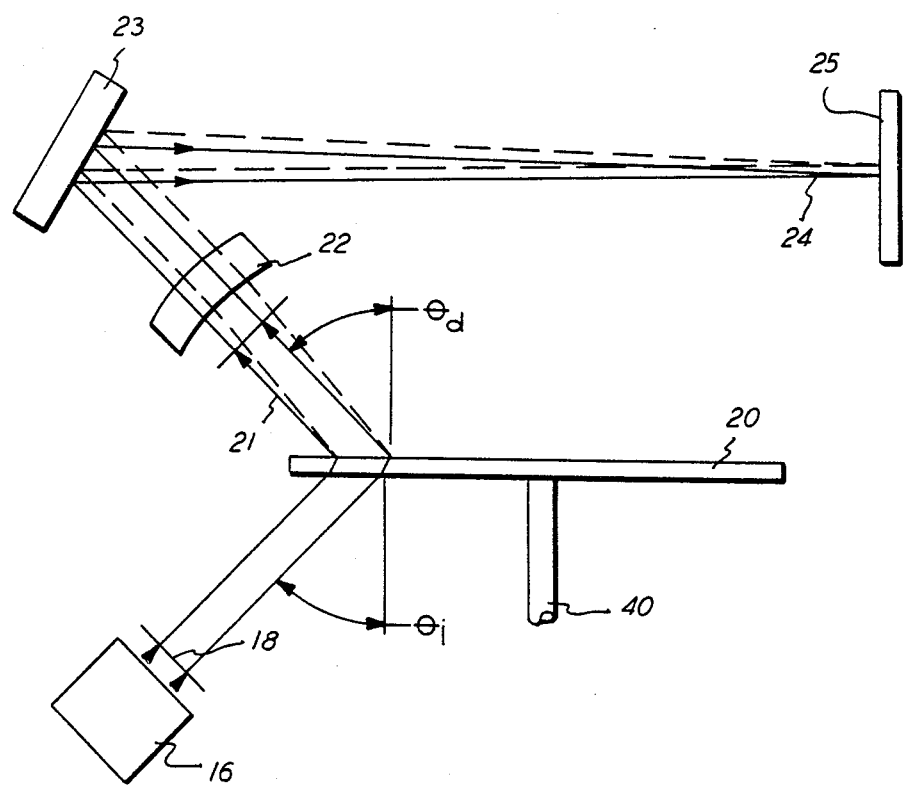
FIG. 1 is a schematic diagram of a prior art optical scanning system.

FIG. 1 schematically illustrates a scanning embodiment described in copending application Ser. No. 044,000 (now U.S. Pat. No. 4,289,371) modified to show the effects of a slightly polychromatic reconstruction light source. In the figure, a light source 16 generates a reconstruction plane wavefront 18 which is incident on plane linear diffraction grating spinner 20 at an angle $\theta_i$. If source 16 is a monochromatic source, such as a He-Ne laser, the wavefront is diffracted at a diffraction angle $\theta_d$ which is wavelength dependent. Doublet lens 22 focuses a linear scan 24 at image plane 25 via plane mirror 23. This linear scan is nearly bow free, and is reasonably insensitive to spinner wobble, decentration and wedge errors, such qualities being attributable to the characteristics of the spinner 20 and the system geometry, as described in said copending application.

If, however, a diode laser is substituted for the He-Ne source 16, a small shift in output wavelength occurs with drive current. Since the diffracted rays at spinner 20 are wavelength sensitive, diffracted rays 21 deviate by some small angle along the dotted path incurring a small deflection of the beam in the cross-scan direction at image plane 25.

Figure 2:
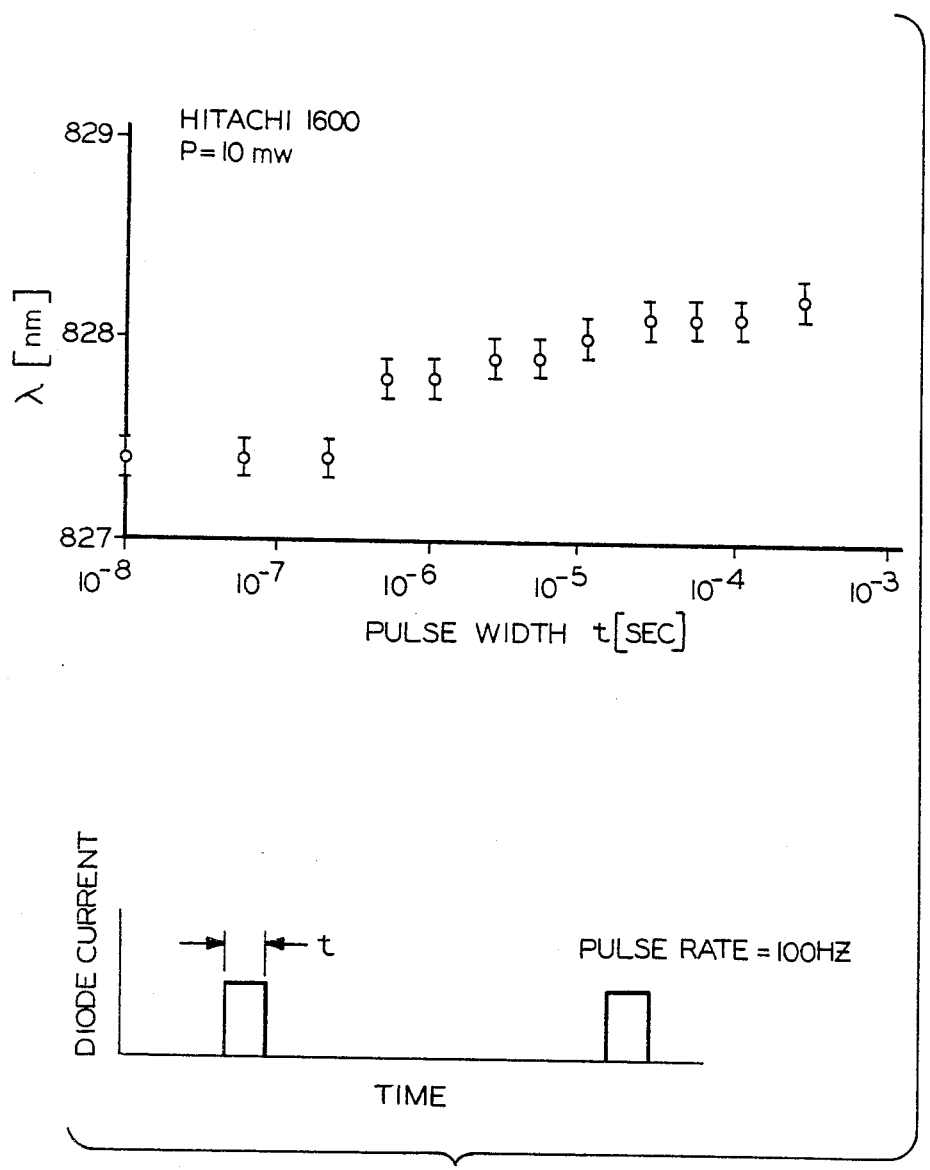
FIG. 2 is a graph showing diode laser wavelength shift as a function of pulse width time resulting in laser heating conditions.
Figure 3:
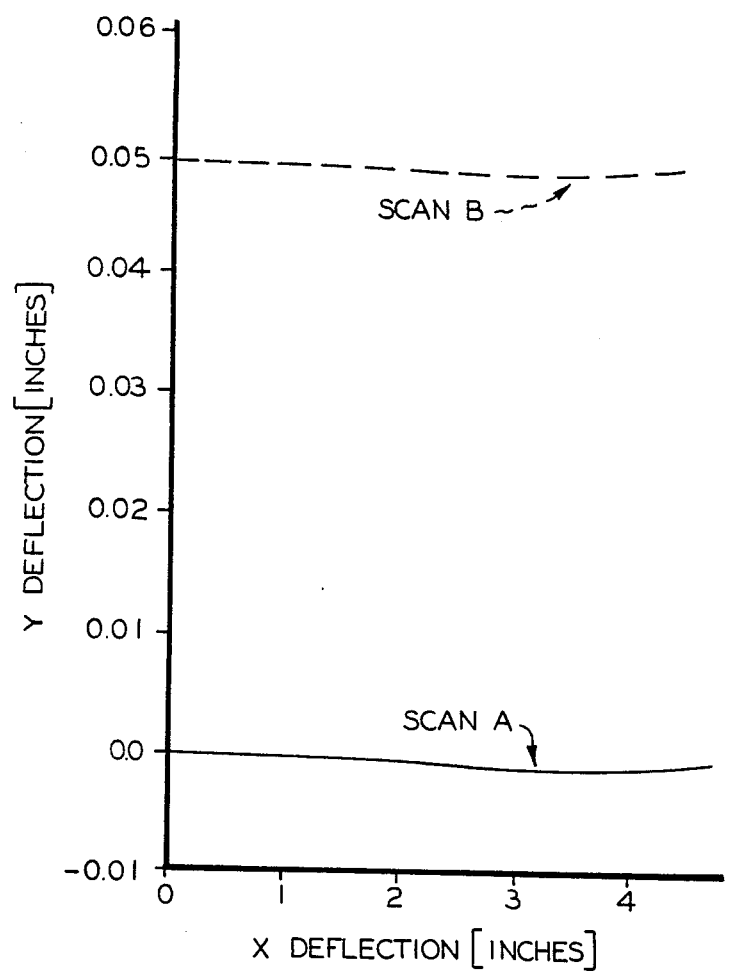
FIG. 3 is a graph plotting cross-scan deflection over one half of a scanned line length as a function of wavelength shift.

The reasons for and extent of the wavelength shift in the diode laser source is made clearer by reference to FIGS. 2 and 3. FIG. 2 is a graph showing test measurements made on a Hitachi Series 1600 diode laser. The central laser wavelength shift of the laser is plotted against pulse width time for short pulses of 100 Hz duty cycle. It can be seen that the heating associated with the pulses has the effect of shifting the peak to longer (lower energy) wavelengths. A shift of ≃0.5 nm occurs over the time duration shown which would be representative of a raster output scan scanning at 300 spots per inch with an image velocity of 2"/sec.

FIG. 3 shows the effects of a wavelength shift of 1 nm along one half of the length of a scanned line in the image plane for the system of FIG. 1. Source 16 is the Hitachi Series 1600 laser having a nominal wavelength λ of 820 nm, $\theta_i$ is 45.45° and $\theta_d$ is 44.55°. Spinner 20 is formed according to the principles of the co-pending application with a spacing period d=0.5798454 μm. (The ratio of λ to d must have a value between 1 and 1.618). Focusing lens 22 is a linearized flat field air spaced doublet with a 26.8" exit pupil to image plane distance (throw distance). In FIG. 3, two scanned spot trajectories, cross-scan deflection (Y) vs scan deflection (X) (center to edge) are plotted for values of λ of 820 nm (scan A) and at 821 nm (scan B) representing a wavelength shift of 1 nm. Spinner 20 is rotated at a speed of 3000 rpm. This 1 nm shift has caused the output diffraction angle to change by an angle B of 0.105° incurring a 0.049 inch deflection of the beam in the cross-scan deflection (Y). Even a 0.5 nm wavelength shift would produce approximately a 0.024 inch deflection. Both of these deflections represent, for most spot scanning systems, an unacceptable level of scan line perturbations at the image plane.

Figure 4:
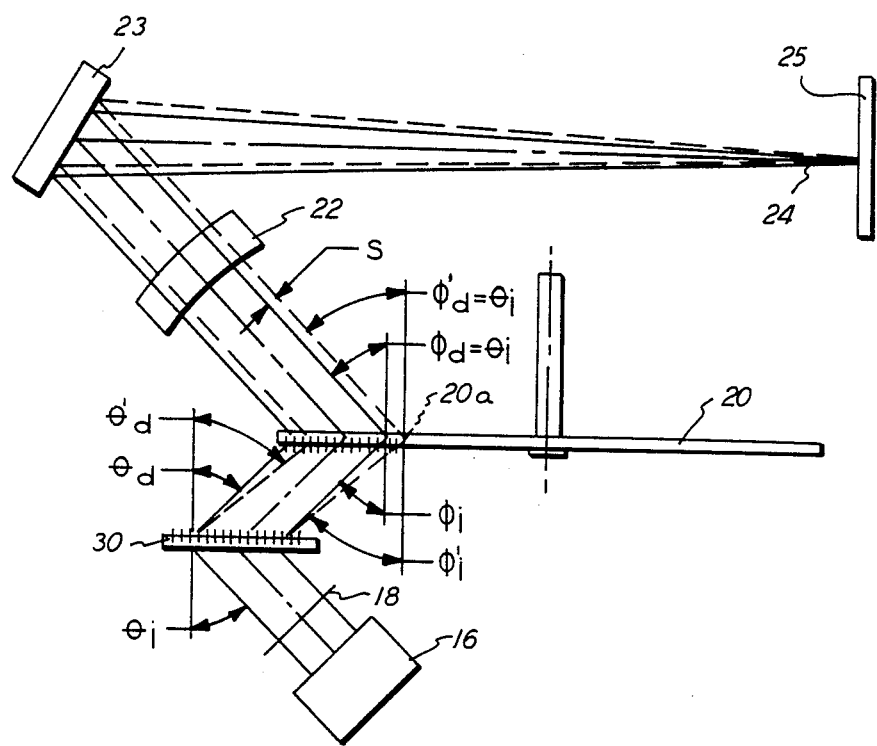
FIG. 4 is the scanning system of FIG. 1 modified to compensate for the effects of wavelength shifts of the reconstruction light source.

FIG. 4 shows the system of FIG. 1 modified according to the invention by the introduction of a plane linear grating 30 into the path of the plane wavefront 18. Grating 30 is a wavelength compensating device which has properties identical to the gratings formed on the surface of spinner 20. In other words, if spinner 20 facets are holographically formed, the grating is holographically formed using the same photorecording system and having the same period as a spinner 20 grating facet and consequently has the same high diffraction efficiency as the spinner. Grating 30 is placed in the tangential plane parallel to the plane of spinner 20. The system of FIG. 4 operates in the following manner. Assuming source 16 is operating at its nominal wavelength of 820 nm, reconstruction beam 18 is directed at the incident angle $\theta_i$ onto grating 30 and is diffracted out at diffraction angle $\theta_d$ (solid line path), the angles measured with respect to normal of the plane of the grating. Since grating 30 and spinner 20a are parallel, by symmetry beam 18 is incident on the center of facet 20a at angle $\phi_i = \theta_d$. Facet 20a diffracts the beam at a diffraction angle $\phi_d$ which is colinear (parallel) with the incident path of beam 18 at grating 30, i.e. $\theta_d = \theta_i$. This result is confirmed by solving for $\phi_d$ in the following grating equation (for grating 20a)

$$\sin \phi_i + \sin \phi_d = \lambda/d.$$

For the FIG. 4 embodiment, typical grating 30 to spinner 20 distance would be ½ to 1 inch and spinner 30 to lens 22 distance ≈1 inch.

With the above geometry in place, it can be appreciated that a reconstruction beam, even if diffracted into a different path because of a small wavelength shift, will nonetheless be diffracted from the spinner in a path colinear with its incidence on the compensation grating but shifted by a small lateral distance. That this results in correction of the cross-scan errors at the image plane can be demonstrated by tracing the scanning path of the reconstruction beam with a small (1-2 nm) shift of the wavelength of source 16. When such a shift occurs, the beam is still incident on grating 30 at angle $\theta_i$ but is diffracted along a slightly different path, represented by the dotted line, at an angle $O'_d$. (The path is chosen at an exaggerated deviation angle for illustrative purposes). The beam is incident on facet 20a at angle $\phi'_i$ and is diffracted out at an angle of $\theta'_d$ and as shown above, $\theta'_d = \theta_i$. The beam is, however, shifted by a lateral distance s from the position of the first beam. This small lateral displacement is of no consequence since lens 22 focuses all image rays entering in parallel to the same point on plane 25. Hence, the scanned line will be corrected for the cross-scan errors.

From the above, it has been demonstrated that even if the laser reconstruction light source experiences wavelength shifts during its operating cycle, these shifts will be corrected for because of the unique geometry and positioning of the grating pairs.

Figure 5:
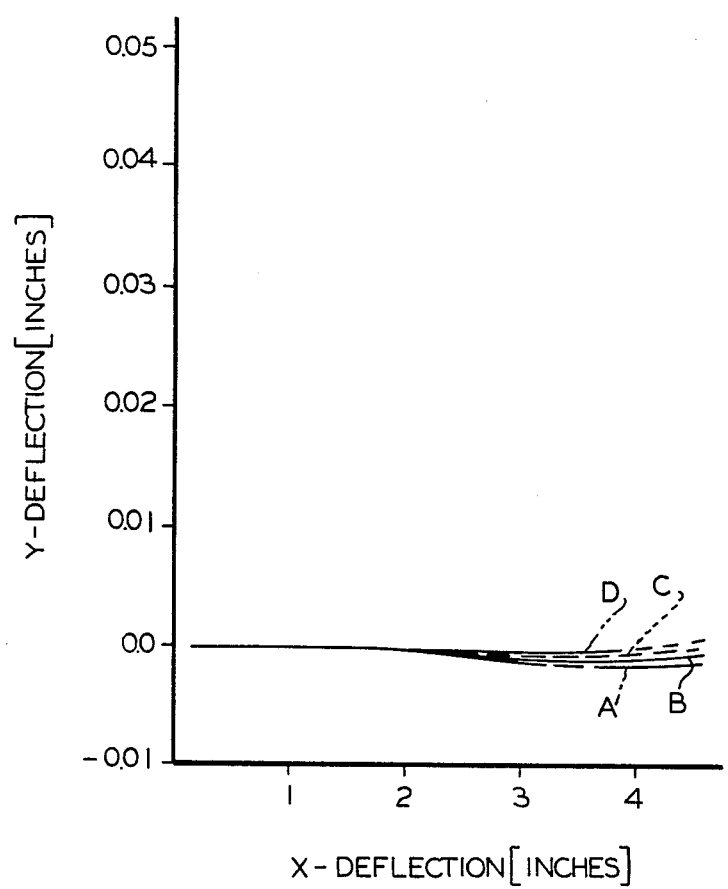
FIG. 5 is a graph plotting cross-scan deflection over one half of a scanned line length as a function of wavelength for the system of FIG. 4.

The cross-scan errors at the scanning plane are completely eliminated only when the beam is at the center position of grating 20a. As the spinner 20 rotates at same angle $\theta_r$, some cross-scan error does occur. For the compensated system of FIG. 4, the scan line trajectories for four different source wavelengths are plotted as shown by the graph of FIG. 5. For the 4.5" scan represented, plots A, B, C and D represent source wavelengths of 819 nm, 820 nm, 821 nm and 822 nm, respectively. As shown, the scan line is deflected only 0.00063"/nm at the edge of the scan. This compares very favorably with the 0.050"/nm deflection in the uncompensated case shown in FIG. 3.

While the above compensation technique almost completely compensates for cross-scan deflection errors, there is no concomitant compensation for a change in scan line length due to wavelength shift. This deflection is quite small; for the above example the edge of scan of 4.5" is altered by 0.0058" for a 1 nm wavelength shift and 0.0029 for a 0.5 nm shift. Deflection of that order should be acceptable for systems scanning up to 8.5". The deflection does appear to be linearly related to scan length and some correction can be achieved by using a high angular efficiency lens 22. A suitable focusing lens for this purpose would be the type described in U.S. Pat. No. 4,108,532, constructed with due regard for the laser diode heating cycles and the consequent wavelength shifts within and between scan lines.

Figure 6:
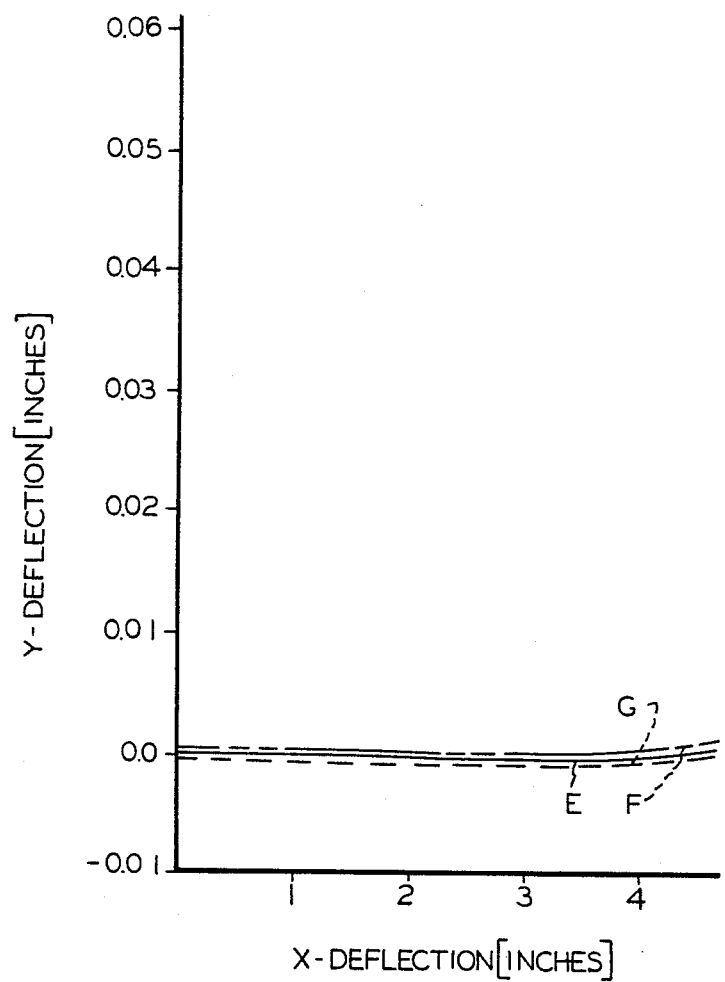
FIG. 6 is a graph plotting cross-scan deflection over one half of a scanned line length as a function of a nominal wavelength of 830 nm and over ±1.5 minute spinner tilt position.
Figure 7:
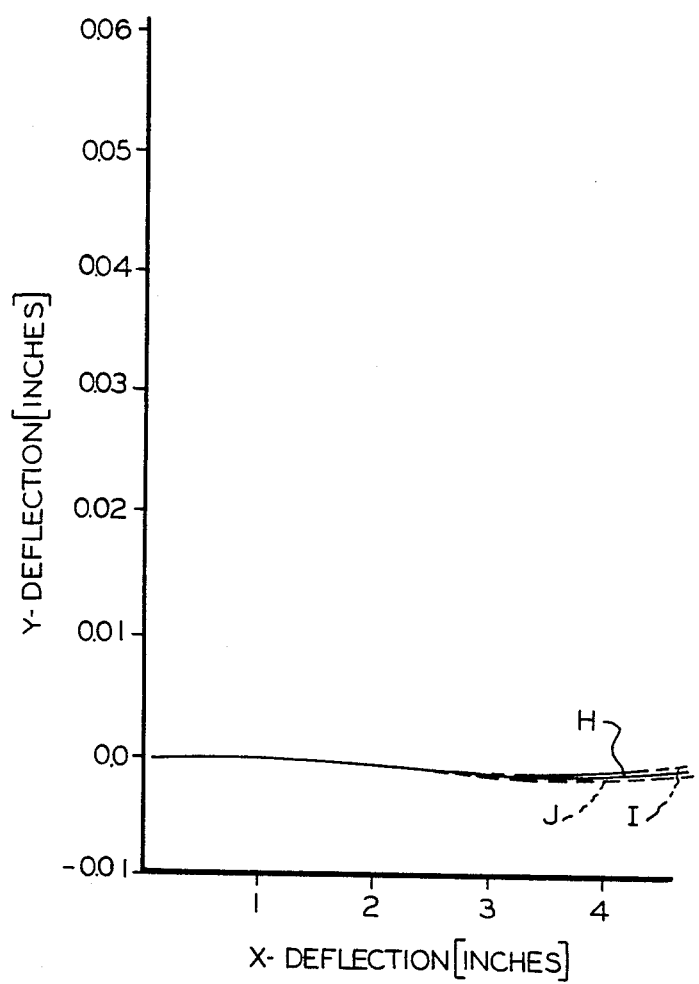
FIG. 7 is a graph plotting cross-scan deflection over one half of a scanned line as a function of a nominal wavelength of 820 nm and over ±1.5 minute spinner belt tilt position.

The above examples utilizing diode lasers as the reconstruction light source considered only relatively small wavelength shifts of ±2nm from the central emission wavelength. As a practical matter, however, due to manufacturing tolerance, actual diode lasers, even from the same batch, may have center emission wavelengths differing by ±15 nm. This may necessitate some deviation from the preferred invariant condition of incidence angle $\theta_i \simeq$ diffraction angle $\theta_d \simeq 45°$. For example, FIG. 6 shows the cross-scan deflection for the FIG. 4 arrangement but with a wavelength of 830 nm and with the grating pair rotated clockwise to make the incident angle $\theta_i = 43.95°$ and diffraction angle $\theta_d = 47.50°$. Plot E represents one half of the nominal scanned line with no spinner tilt while plots F and G represent the lines resulting from a ±1.5 minute wobble, or tilt, of spinner 20. As a comparison, FIG. 7 shows the cross-scan deflection for the 820 nm wavelength at a ±1.5 minute spinner tilt (plots H,I,J respectively). ($\theta_i = 45.45$, $\theta_d = 44.55$). As shown, the cross-scan errors are smaller in FIG. 7 due to the angle of incidence being nearer the invariant condition of 45°. While the gratings could remain in the same position and the reconstruction path change position, the easiest set-up technique is to rotate the parallel gratings while monitoring the output scan line and fix the gratings into the optimum cross-scan compensation position.

Various changes and modifications may be made to the above described compensation system without departing from the principles of the present invention. For example, it may be desirable to have the spinner and compensation member have their grating surface face each other. This orientation would help to keep the grating surfaces clean. Also, although transmission type gratings were used in the examples, reflective-type gratings can also be used with different orientation of light source and parallel spacing.

What is claimed is:

1. An optical scanning system including
    a spinner having formed thereon at least one plane linear diffraction grating having a constant grating period d,
    a stationary wavelength compensation diffraction grating having properties identical to said grating formed on said spinner surface, said stationary grating placed in a plane parallel and in optical alignment with said spinner grating,
    a collimated reconstruction light source of wavelength $\lambda_r$ which provides a beam of light directed at an angle of incidence $\theta_i$ onto said compensation grating, said grating diffracting said beam at a diffraction angle of $\theta_d$,
    said incidence angle $\theta_i \simeq \theta_d \simeq 45°$, and the ratio of $\lambda_r$ to spacing d having a value between 1 and 1.618,
    means for rotating said spinner so that the spinner grating rotates through some rotation angle and diffracts a portion of the incident light at diffraction angle $\theta_d$, and
    optical means to focus said diffracted beams as a linear scan line on an image plane.

2. The optical scanning system of claims 1 wherein the light source is a diode laser.

3. The optical scanning system of claim 2 wherein said diode laser is subject to wavelength shifts of up to ±2 nm resulting in a reconstruction beam deviation which is compensated for by the diffraction properties of said compensation grating in conjunction with the spinner grating.

4. The optical scanning system of claim 1 wherein the optical means is a linearized, flat-field, air spaced doublet.

5. The optical scanning system of claim 1 wherein said spinner and compensation gratings are of the transmission type.

6. The optical scanning system of claim 5 wherein said gratings are formed on the respective surfaces of said spinner and compensation gratings and said surfaces are aligned in said parallel planes so as to face inward towards each other.

7. The optical scanning system of claim 1 wherein said spinner and compensation gratings are of the reflective type.

* * * * *